Dec. 24, 1940. G. J. LANGMYHR 2,225,872
PRESSURE RELEASE VALVE FOR REACTION CHAMBERS
Filed Oct. 27, 1938
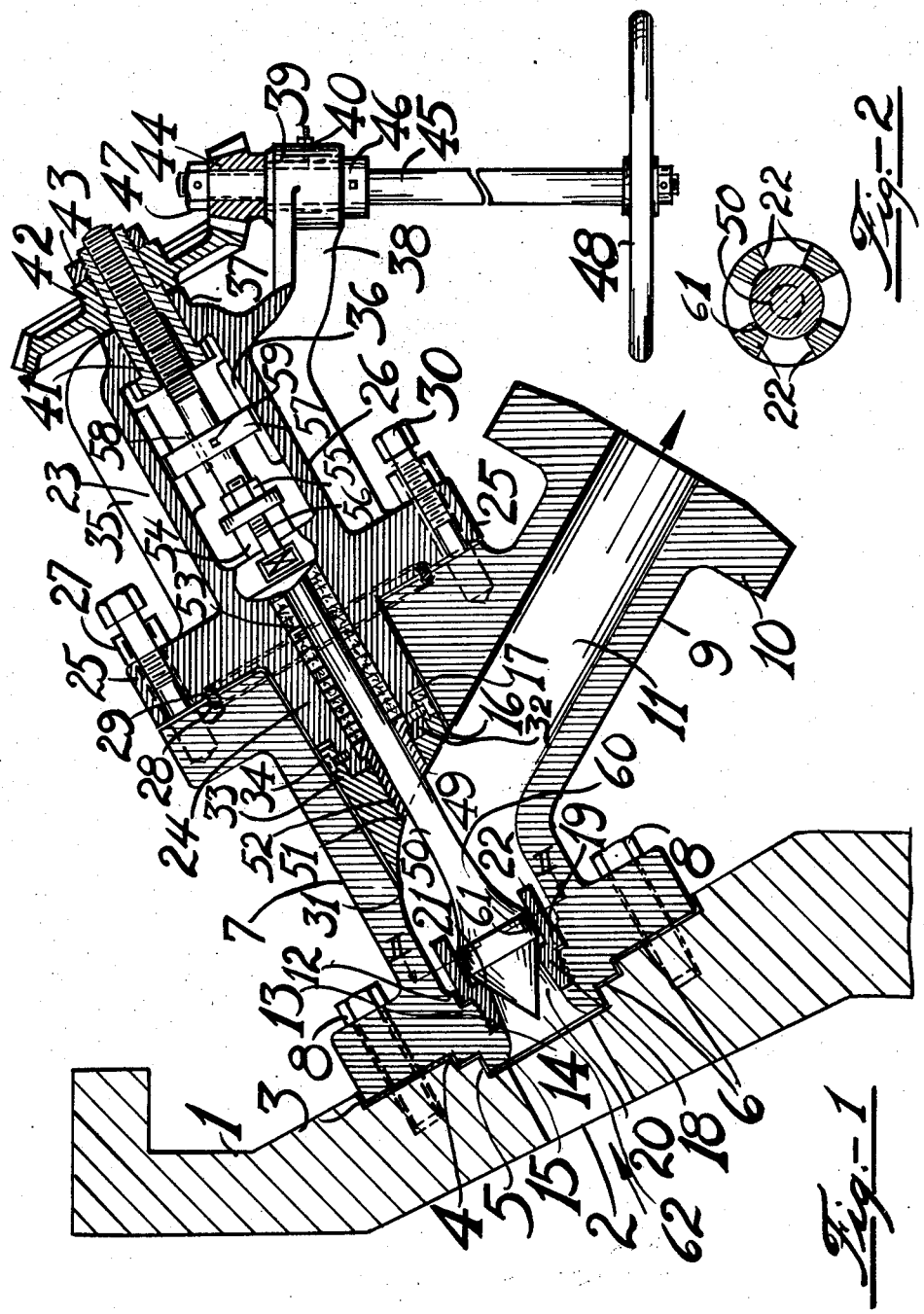
George J. Langmyhr Inventor
By [signature] Attorney Patented Dec. 24, 1940

2,225,872

UNITED STATES PATENT OFFICE 2,225,872

PRESSURE RELEASE VALVE FOR REACTION CHAMBERS

George J. Langmyhr, Sarnia, Ontario, Canada, assignor to Standard Oil Development Company, a corporation of Delaware Application October 27, 1938, Serial No. 237,181

4 Claims. (Cl. 251—49)

This invention relates to a valve structure, and more particularly to a pressure release or control valve providing for a controlled flow of fluids through the valve with a minimum of turbulence. More particularly, the invention relates to a valve adapted to control the release of hot liquids and gases from a pressure reaction vessel, and specifically a pressure release or control valve for the discharge opening in a reaction vessel of a pretroleum cracking system, or the like.

It is a primary object of the invention to substantially eliminate the deposition, at the discharge opening of a reaction vessel, of solidifiable materials contained in the stream of reaction products passed therethrough. It is another object of the invention to substantially reduce the erosive action of the discharged reaction products on valve parts with which such products come in contact. And it is a further object of the invention to accomplish the release of reaction products from a heated reaction vessel with a substantial reduction in the cooling of such products prior to the point of pressure release.

Other objects of the invention will be apparent, and may be fully understood from the following specification when it is read in conjunction with the accompanying drawing, in which:

Fig. 1 is a side elevational view of the valve with parts broken away, and partly in vertical section.

Fig. 2 is a cross-sectional view of the valve seat and head along the line II—II.

Referring to the Figs. 1 and 2, the numeral 1 designates a pressure reaction vessel, in which is provided a discharge opening 2. Normally, a nozzle of some considerable length is affixed to the vessel wall surrounding the opening and provides a seat for a standard type control valve secured to the outer end of the nozzle. As shown in Fig. 1, however, the outer surface of the vessel 1, surrounding the opening 2, is machined to form a series of annular, shouldered surfaces 3, 4 and 5, of increasing depth, all concentric with the opening in vessel, and providing thereby a seat for the inner end 6 of the valve body 7, which end has been formed or machined in a corresponding manner. Stud bolts 8 maintain the valve body in fluid-tight relation to the seat provided therefor. If desired, suitable gaskets may be interposed between the shouldered surfaces of the valve body and seat.

The valve body 7, which is preferably formed or cast in one piece, includes a nozzle portion 9, which extends angularly from the body of the valve, and a flanged portion 10 at the outer end. The nozzle portion is also flanged to provide for connection with a conventional pipe line. A conduit passage 11 extends concentrically through the nozzle 9 into the valve body 7, in which it is expanded in a smooth curve to a slightly increased diameter, concentric with the axis of the valve body, and extending toward the inner end 6. Within the valve body and adjacent the inner end thereof, the diameter of the passage 11 is progressively reduced by a series of inwardly extending, annular shoulders 12 and 13, spaced by a threaded wall 14. From the lip of shoulder 13, the passage then flares outward through the inner end of the valve body, forming a bell-mouthed opening 15, communicating with, and of substantially the same diameter as the opening 2 in the vessel 1.

The valve body 7 has a centrally disposed bore 16 which extends inwardly through the outer end portion of the valve body, and opens into the conduit portion 11 above the opening 15 and concentrically therewith. The bore 16 is formed with walls tapering inwardly from the outer opening of the bore to a diameter at the inner end which may be no less than that of the passage 11 at the shoulder 12. At an intermediate point on the outer surface of a plug portion 24, there is provided an annular sealing ring groove 17.

A valve-seat plug 18, introduced into the passage 11 by way of the bore 16, is disposed in threaded engagement with the wall 14, with the lower end of the plug abutting against the shoulder 13. The upper end of the plug 18 carries a flange 19 which, with the plug emplaced, is in spaced relation to the shoulder 12. A gasket may be inserted between flange and shoulder if desired. A passage 20 is provided through the plug 18, tapering inward from a diameter equal to that of the passage 12 at the lip of shoulder 14, to a point adjacent the upper end of the plug, where it flares outward to provide a conical valve seat 21. On the upper surface of the flange 19, and spaced from the upper edge of the seat 21, are disposed wing guide members 22.

A valve bonnet assembly 23, comprising a plug portion 24, a flange portion 25 and yoke portion 26, is secured to the outer end of the valve body. The plug portion 24 is insertable in the bore 16 and the assembly may be secured to the valve body by means of stud bolts 27. The under surface of the flange 25 is provided with a sealing ring groove 28, corresponding to the groove 17, and within the grooves is disposed a sealing ring 2C. Starting screws 30 are also provided in the flange 25, to free the plug from the valve body when necessary.

The plug portion 24 extends into the bore 16 for the entire length thereof, terminating in a deflector surface 31 conforming to the contours of the conduit passage 11. Preferably, the plug 24 is formed in two parts, the inner end terminating in a boss 32 over which a deflector cap 33 is secured by means of flush stud screws 34, and in this manner the deflector surface may be quickly replaced at little cost. The plug portion 24 is fitted in the bore 16 with liberal clearance to avoid sticking.

The yoke portion 26, as shown is formed of two or more webbed arms 35 of which two are opposed, and are provided with key members 36 extending vertically of a portion of their inner surfaces. The arms 35 terminate in a collar portion 37. From one of the arms 35, a support arm 38 extends angularly outward, terminating in a collar 39 provided for internal lubrication as by pressure fitting 40. A sleeve 41, inserted in the yoke collar 37, is flanged at its lower end and internally threaded. The sleeve, extending outward beyond the collar, has a shouldered portion on which is carried a bevel gear 42. The gear is keyed to the sleeve and held in place by a nut 43 threaded on the sleeve end. The gear 42 and sleeve 41 are rotated by means of a smaller gear 44 carried by a shaft 45 journalled in collar 39. A shaft collar 46 and a shaft nut 47 prevent vertical movement of the shaft. Mechanical means, or manual means such as wheel 48, may be provided for rotating the shaft and gear assembly. It should also be obvious that a hand wheel might be substituted for the gear 42.

As shown, the valve bonnet, including the flange portion 25 and the plug portion 24, has a central passage 49. The passage 49 is of somewhat greater diameter than required for the valve stem 50 extending therethrough, and adjacent the inner end the passage is reduced, as by a shouldered portion 51. A flanged sleeve 52, supported in the passage by means of the shoulder 51, provides a bearing for the valve stem 50 adjacent its inner end. The inner end of the sleeve 52 exactly conforms to the curvature of the deflector surface 31. Above the sleeve 52, and surrounding the valve stem 50 a packing material 53 fills the passage 49, and is held in place by means of a gland member 54, which may be forced against the packing by means of nuts 55 threaded on the studs 56 removably inserted in slots disposed peripherally of the base of yoke 26.

The valve stem 50 is threaded at its upper or outer end for engagement within the sleeve 41. Intermediate that portion of the stem which normally is exposed between the gland member 54 and the threaded end, a slide member 57 is secured to the stem 50 by means of key 58 and pin 59. The slide may be of any convenient shape, but should provide for sliding engagement with key members 36.

At its inner end, the valve stem 50 carries a head 60 which is preferably formed integral with the stem, and conforms to the generally streamline characteristics of the valve structure. At a point adjacent the end, the valve stem is smoothly flared to a diameter approximating but slightly less than that of the plug 18 between the inner surfaces of the guide members 22. For a short distance beyond that point, the diameter is then maintained constant, forming an annular, flat, bearing surface 61 for slidable engagement with the guide members 18. Beyond the bearing surface 61, the head tapers inward to form a conical plug portion 62 which is adapted to seat against the conical seat 21.

The valve structure set forth is adaptable for a wide variety of uses, but it has special utility when used as a release or throttle valve on reaction chambers of petroleum cracking apparatus. The design permits direct application of the valve body to the pressure vessel thereby avoiding the cooling effect normally produced when a release valve is attached to a discharge nozzle, rather than to the vessel itself. Having an internal conformation and structure of streamline characteristics, the valve according to the invention accomplishes an improvement in the operation of the equipment to which it is attached. Erosion and carbon formation are substantially reduced.

By virtue of the two part construction of the valve plug, it is possible to renew the deflector surface, against which the released fluids impinge with greatest force. Also, by means of the guide members carried on the valve seat plug, the valve head is supported against lateral movement or vibration which may be caused by the escape of a high velocity fluid stream. Distortion of the valve stem is thus largely prevented.

The scope and application of the invention set forth will be fully apparent to those skilled in the art. Various modifications of the apparatus as set forth may be possible, and it is intended that the invention shall not be limited by the description set forth for the purpose of illustration, but only by the appended claims in which is is intended to claim all novelty inherent in the invention.

I claim:

1. A valve structure comprising a valve body, a streamline conduit therethrough, having an inlet portion, a tapered passage through one end of the valve body communicating with said conduit, a plug for said passage disposed in spaced relation to the walls thereof and having an inner end shaped to conform with said conduit, a yoke carried by the plug, a bore through said plug, a spindle extending through said bore, in fluid-tight relation thereto, into said conduit, a valve head on said spindle and a seat for said head disposed in the inlet portion of the conduit, said seat including guide means for the head, and means, carried by the yoke, for imparting straight line, non-rotating motion to said spindle.

2. A valve structure, comprising a valve body, a streamline conduit therethrough having a flared and shouldered inlet, and an outlet, a passage in said body opening into the conduit above the inlet, a valve bonnet including a plug for said passage, said plug having an end portion conformed with the conduit walls, a flanged portion engaging the body and a yoke member on said flange, a valve seat plug in said shouldered inlet having vertical wing members extending into the conduit, a valve stem, having a head within said conduit to engage said seat and wing member, extending through a passage in said plug, and means carried by said yoke and stem for non-rotating movement of the valve head toward and away from the seat.

3. A valve structure, comprising a valve body, a streamline conduit therethrough, an inwardly tapered passage in the valve body communicating with said conduit, and a valve bonnet, secured to said valve body, including a plug for the tapered passage disposed in spaced relation to the walls thereof, a bore through said plug having a reduced diameter adjacent the inner end, a shoulder formed thereby, a flanged sleeve disposed in the inner end of the bore supported by said shoulder, the inner ends of said sleeve and plug being shaped to conform with the walls of said conduit, a valve stem through said bore in slidable contact with said sleeve, and a packing material encircling the stem above said flanged portion.

4. A valve structure, comprising a valve body having a streamline conduit therethrough, an inwardly tapered passage in said body communicating with said conduit, a valve bonnet secured to said valve body including a plug for said passage terminating within the passage and having a shouldered portion at its inner end, a deflector cap engaging said shouldered portion, a bore through said plug terminating in an annular shoulder, a bore of reduced diameter in said cap, a flanged sleeve in said plug bore engaging the annular shoulder and extending through said cap, said cap and sleeve terminating at the wall of the conduit, the ends being conformed to the shape of said conduit.

GEORGE J. LANGMYHR.